United States Patent
Yu et al.

(10) Patent No.: US 10,343,140 B2
(45) Date of Patent: Jul. 9, 2019

(54) SYSTEM WITH MULTIPLE ADSORBENTS FOR AMMONIA AND ORGANIC REMOVAL

(71) Applicant: Hamilton Sundstrand Corporation, Charlotte, NC (US)

(72) Inventors: Ping Yu, West Hartford, CT (US); Holden Timothy Ranz, West Hartford, CT (US); Timothy A. Nalette, West Strafford, CT (US); Gregory Quinn, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/289,402

(22) Filed: Oct. 10, 2016

(65) Prior Publication Data

US 2018/0099262 A1   Apr. 12, 2018

(51) Int. Cl.
| | |
|---|---|
| *B01J 20/20* | (2006.01) |
| *B01J 20/08* | (2006.01) |
| *B01J 20/26* | (2006.01) |
| *B01J 20/02* | (2006.01) |
| *B01J 20/28* | (2006.01) |
| *B01D 53/04* | (2006.01) |
| *C02F 1/28* | (2006.01) |
| *C02F 101/16* | (2006.01) |
| *C02F 101/30* | (2006.01) |

(52) U.S. Cl.
CPC ............ *B01J 20/20* (2013.01); *B01D 53/04* (2013.01); *B01D 53/0407* (2013.01); *B01J 20/02* (2013.01); *B01J 20/0244* (2013.01); *B01J 20/0288* (2013.01); *B01J 20/08* (2013.01); *B01J 20/261* (2013.01); *B01J 20/28016* (2013.01); *C02F 1/281* (2013.01); *C02F 1/283* (2013.01); *C02F 1/288* (2013.01); *B01D 2253/102* (2013.01); *B01D 2253/104* (2013.01); *B01D 2253/112* (2013.01); *B01D 2253/1122* (2013.01); *B01D 2253/25* (2013.01); *B01D 2253/302* (2013.01); *B01D 2257/406* (2013.01); *B01D 2257/70* (2013.01); *B01D 2259/402* (2013.01); *B01D 2259/4575* (2013.01); *C02F 2101/16* (2013.01); *C02F 2101/30* (2013.01)

(58) Field of Classification Search
CPC ....................................................... B01J 20/20
See application file for complete search history.

(56) References Cited

U.S. PATENT DOCUMENTS

| | | | | |
|---|---|---|---|---|
| 4,072,480 | A | * | 2/1978 | Wagner ................. B01D 53/02 502/417 |
| 5,714,126 | A | * | 2/1998 | Frund .................... A62B 23/02 422/122 |
| 8,420,038 | B2 | | 4/2013 | England |
| 2015/0144831 | A1 | | 5/2015 | Mennell et al. |
| 2016/0166970 | A1 | | 6/2016 | Boehringer et al. |

* cited by examiner

*Primary Examiner* — Stuart L Hendrickson
(74) *Attorney, Agent, or Firm* — Carlson, Gaskey & Olds, P.C.

(57) ABSTRACT

An adsorbent system includes a passage and first and second adsorbents in the passage. The first adsorbent includes granules of non-impregnated activated carbon and the second adsorbent includes granules of acid- or metal salt-impregnated adsorbent. The granules of acid- or metal salt-impregnated adsorbent have, by weight, at least 20% acid or metal salt content. The granules of acid- or metal salt-impregnated adsorbent have, by weight, at least 35% acid or metal salt content. The granules of non-impregnated activated carbon and the granules of acid- or metal salt-impregnated adsorbent have a size of mesh 4 to mesh 40, and, by total combined weight of the granules of non-impregnated activated carbon and the granules of acid- or metal salt-impregnated adsorbent, the first adsorbent has 55%-75% of the granules of non-impregnated activated carbon and the second adsorbent has 45%-25% of the granules of acid- or metal salt-impregnated adsorbent.

17 Claims, 1 Drawing Sheet

SYSTEM WITH MULTIPLE ADSORBENTS FOR AMMONIA AND ORGANIC REMOVAL

BACKGROUND

Outer space applications often recycle fluid streams to provide clean water or air, for example. Where size and weight capacity permits, a condensing heat exchanger may be used to remove contaminant substances. Where size and weight capacity does not permit a heat exchanger, adsorbent materials can be used to remove contaminant substances. There typically are many target contaminant substances for removal. The adsorbent material often has differing effectiveness for removing different ones of the target contaminant substances.

SUMMARY

An adsorbent system according to an example of the present disclosure includes a passage and first and second adsorbents in the passage. The first adsorbent includes granules of non-impregnated activated carbon and the second adsorbent includes granules of acid- or metal salt-impregnated adsorbent. The granules of acid- or metal salt-impregnated adsorbent have, by weight, at least 20% acid or metal salt content. The granules of acid- or metal salt-impregnated adsorbent have, by weight, at least 35% acid or metal salt content. The granules of non-impregnated activated carbon and the granules of acid- or metal salt-impregnated adsorbent have a size of mesh 4 to mesh 40, and, by total combined weight of the granules of non-impregnated activated carbon and the granules of acid- or metal salt-impregnated adsorbent, the first adsorbent has 55%-75% of the granules of non-impregnated activated carbon and the second adsorbent has 45%-25% of the granules of acid- or metal salt-impregnated adsorbent.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Generally, adsorbent systems are used to remove contaminant substances from fluid streams, such as water or air streams. For instance, a low acid content adsorbent may be used in a space suit for "general purpose" removal of trace organic contaminants, ammonia, and other contaminants from recycle streams. However, although the general purpose low acid content adsorbent removes a variety of different contaminants, it may not be particularly well-suited for efficiently removing both organic contaminants and ammonia. Therefore, a relatively large amount of the general purpose low acid content adsorbent would be needed. In this regard, as will be discussed in further detail below, the adsorbent system disclosed herein is configured for enhanced removal of organic contaminants and ammonia. As a result of such enhanced removal capability, there is also the potential to use less adsorbent material and thus achieve more compact treatment systems.

Figure 1A:
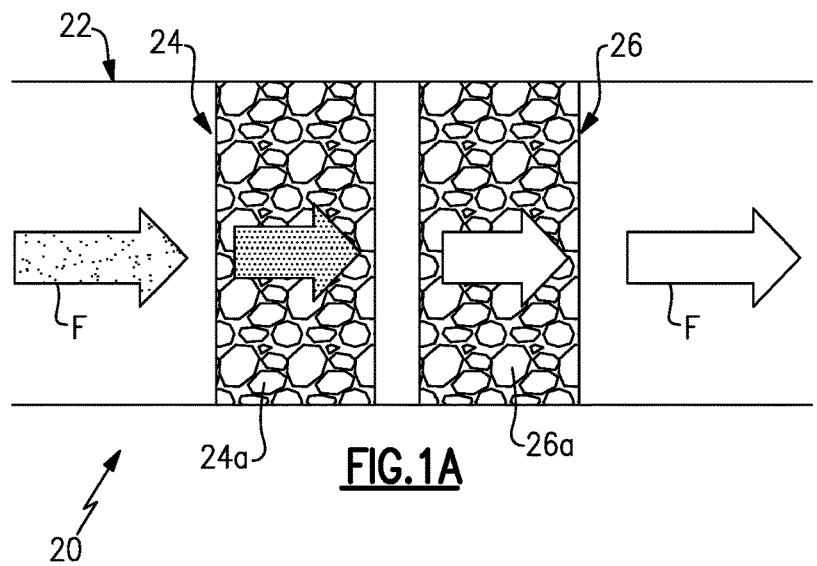
FIG. 1A illustrates an example adsorbent system.

FIG. 1A schematically illustrates an adsorbent system 20. In this example, the system 20 includes a passage 22 and first and second adsorbents 24/26. In the illustrate example, the first and second adsorbents 24/26 are arranged in beds in series in the passage 22. In this example, with respect to a gas flow (F), the second adsorbent 26 is arranged downstream from the first adsorbent 24. As will be appreciated, the downstream arrangement is relative to the source and end use of the fluid.

The first adsorbent 24 includes granules 24a of non-impregnated activated carbon, and the second adsorbent 26 includes granules 26a of acid- or metal salt-impregnated adsorbent. As used herein, a "granule" may be a particle, a pellet (e.g., a cylinder), a fiber, a fine powder particle, or other relatively small body. The granules 26a of the acid- or metal salt-impregnated adsorbent have, by weight, at least 20% acid content or 20% metal salt content, and the adsorbent may be a porous support, such as but not limited to, activated carbon, metal oxide (e.g., alumina), polymer (e.g., polymethylmethacrylate). The acid may include, but is not limited to, phosphoric acid. One example metal salt is zinc chloride. The size of the granules 24a/26a is relatively small. In one example, the granules 24a/26a have a size of mesh 4 to mesh 40 to provide good fluid exposure and meet pressure drop performance requirements.

Figure 1B:
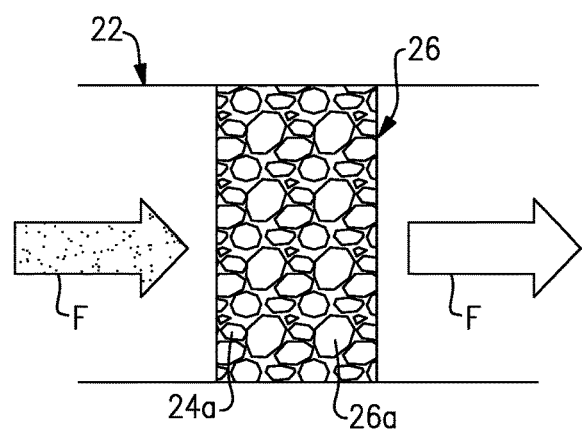
FIG. 1B illustrates an example adsorbent system with a mixed bed.

The granules 24a of non-impregnated activated carbon are better for removal of organic contaminants from the flow F, while the granules 26a of the acid- or metal salt-impregnated adsorbent are better for the removal of ammonia from the flow F. In comparison, a activated carbon with a low acid content can remove both organic contaminants and ammonia, but is less effective for organic contaminant removal than the non-impregnated activated carbon and is also less effective for the removal of ammonia than the acid-impregnated activated carbon with at least 20% acid or metal salt content. Thus, as the flow F passes through the first adsorbent 24, the granules 24a of non-impregnated activated carbon first remove organic contaminants from the flow F. The somewhat purified flow F then passes through the second adsorbent 26a, which removes ammonia to produce a clean flow F. It is to be understood, however, that in modified examples the second adsorbent 26 may instead be arranged upstream from the first adsorbent 24. In one modified example shown in FIG. 1B, there is at least one mixed bed 28 instead of or in addition to individual beds of the adsorbents 24/26. A mixed bed has a mixture of granules 24a and granules 26a.

In further examples, the granules 26a of the acid- or metal salt-impregnated adsorbent have, by weight, at least 30% acid or metal salt content for even more effective removal of ammonia from the flow F. In yet a further example, the granules 26a of the acid- or metal salt-impregnated adsorbent have at least 35% acid or metal salt content for an even greater effectiveness of removal of ammonia.

In a further example, the amounts of the granules 24a/26a in the first and second adsorbents 24/26 are selected with respect to each other for enhanced removal of organic contaminants and ammonia. As an example, by total combined weight of the granules 24a of the non-impregnated activated carbon and the granules 26a of the acid- or metal salt-impregnated adsorbent, the first adsorbent 24 has 45%-85% of the granules 24a and the second adsorbent 26 has 55%-15% of the granules 26a. In a further example, again by the total combined weight, there is a lower percentage of the granules 26a than of the granules 24a. In one example, again by total combined weight, the first adsorbent 24 has 55%-75% of the granules 24a, and the second adsorbent 26 has 45%-25% of the granules 26a.

Figure 2:
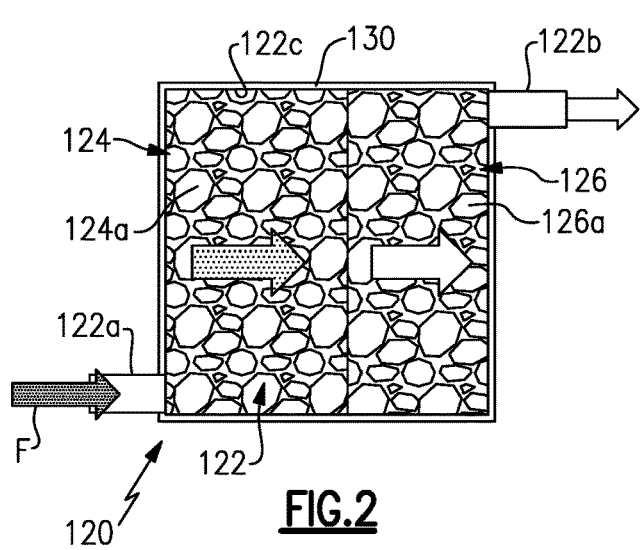
FIG. 2 illustrates another example adsorbent system that includes a canister.

FIG. 2 illustrates another example adsorbent system 120 that is somewhat similar to the system 20 described above. In this disclosure, like reference numerals designate like elements where appropriate and reference numerals with the addition of one-hundred or multiples thereof designate modified elements that are understood to incorporate the same features and benefits of the corresponding elements. In this example, the adsorbent system 120 includes a canister 130 that has a passage 122 defined by an inlet 122a, an outlet 122b, and a cavity 122c that connects the inlet 122a and the outlet 122b.

The first and second adsorbents 124/126 are arranged in beds in the cavity 122c. As will be appreciated, the cavity 122c may be divided into sub-cavities that serve to secure the first and second adsorbents 124/126 and/or direct flow. The first adsorbent 124 is arranged proximate the inlet 122a, and the second adsorbent 126 is arranged downstream from the first adsorbent 124 proximate the outlet 122b. Similar to the system 20, the first adsorbent 124 includes granules 124a of non-impregnated activated carbon, and the second adsorbent 126 includes granules 126a of acid- or metal salt-impregnated adsorbent. As discussed above, the granules 126a of the acid- or metal salt-impregnated adsorbent can have, by weight, at least 20% acid or metal salt content, at least 30% acid or metal salt content, or at least 35% acid or metal salt content. Also similar to the system 20, the first and second adsorbents 124/126 can have the weight ratio of the granules 124a/126a as discussed above.

The arrangement of the first adsorbent 124 proximate the inlet 122a and the second adsorbent 126 downstream from the first adsorbent 124 proximate the outlet 122b serves to first pass the flow F through the first adsorbent 124 with the granules 124a of non-impregnated activated carbon. The non-impregnated activated carbon removes organic contaminants from the flow. The flow then passes through the second adsorbent 126 with the granules 126a of acid- or metal salt-impregnated adsorbent, to remove ammonia. By first removing the organic contaminants using the first adsorbent 124, there is reduced potential for the organic contaminants to block or take up active removal sites in the granules 126a of acid- or metal salt-impregnated adsorbent in the second adsorbent 126. The active removal sites can thus more effectively remove ammonia. Moreover, by utilizing the two separate, distinct beds of the adsorbents 124/126, there is greater exposure of the fluid to each adsorbent 124/126. It is to be understood, however, that in modified examples the second adsorbent 126 may be proximate the inlet 122a and the first adsorbent 124 may be downstream from the second adsorbent 126 proximate the outlet 122b. In another alternative, one or more mixed beds may be used. A mixed bed has a mixture of granules 124a and granules 126a, which may also be provided in the weight ratios described above.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An adsorbent system comprising:
 a passage; and
 first and second adsorbents in the passage, the first adsorbent including granules of non-impregnated activated carbon and the second adsorbent including granules of acid- or metal salt-impregnated adsorbent, and the granules of acid- or metal salt-impregnated adsorbent having, by weight, at least 20% acid or metal salt content, wherein the granules of acid- or metal salt-impregnated adsorbent have, by weight, at least 35% acid or metal salt content, the granules of non-impregnated activated carbon and the granules of acid- or metal salt-impregnated adsorbent have a size of mesh 4 to mesh 40, and, by total combined weight of the granules of non-impregnated activated carbon and the granules of acid- or metal salt-impregnated adsorbent, the first adsorbent has 55%-75% of the granules of non-impregnated activated carbon and the second adsorbent has 45%-25% of the granules of acid- or metal salt-impregnated adsorbent.

2. The adsorbent system as recited in claim 1, wherein the granules of acid- or metal salt-impregnated adsorbent have, by weight, at least 20% acid content or at least 20% metal salt content.

3. The adsorbent system as recited in claim 1, wherein the acid- or metal salt of the granules of acid- or metal salt-impregnated adsorbent are on a porous support of a metal oxide or a polymer.

4. The adsorbent system as recited in claim 3, wherein the porous support is of the polymer, and the polymer is polymethylmethacrylate.

5. The adsorbent system as recited in claim 3, wherein the porous support is of the metal oxide, and the metal oxide is alumina.

6. The adsorbent system as recited in claim 3, wherein the granules of acid- or metal salt-impregnated adsorbent have the acid, and the acid is phosphoric acid.

7. The adsorbent system as recited in claim 3, wherein the granules of acid- or metal salt-impregnated adsorbent have the metal salt, and the metal salt is zinc chloride.

8. The adsorbent system as recited in claim 1, wherein the second adsorbent is upstream or downstream from the first adsorbent.

9. The adsorbent system as recited in claim 1, wherein first and second adsorbents are mixed.

10. An adsorbent system comprising:
 a canister having a passage defined by an inlet, an outlet, and a cavity connecting the inlet and the outlet; and
 first and second adsorbent beds in the cavity, the first adsorbent bed arranged proximate the inlet and the second adsorbent bed arranged downstream from the first adsorbent bed proximate the outlet, the first adsorbent bed including granules of non-impregnated activated carbon and the second adsorbent bed including granules of acid- or metal salt-impregnated adsorbent, wherein the granules of acid- or metal salt-impregnated adsorbent have, by weight, at least 35% acid or metal salt content, the granules of non-impregnated activated carbon and the granules of acid- or metal salt-impregnated adsorbent have a size of mesh 4 to mesh 40, and, by total combined weight of the granules of non-impregnated activated carbon and the granules of acidor metal salt-impregnated adsorbent, the first adsorbent bed has 55%-75% of the granules of non-impregnated activated carbon and the second adsorbent bed has 45%-25% of the granules of acid- or metal salt-impregnated adsorbent.

11. The adsorbent system as recited in claim 10, wherein the acid- or metal salt of the granules of acid- or metal salt-impregnated adsorbent are on a porous support of a metal oxide or a polymer.

12. The adsorbent system as recited in claim 11, wherein the porous support is of the polymer, and the polymer is polymethylmethacrylate.

13. The adsorbent system as recited in claim 11, wherein the porous support is of the metal oxide, and the metal oxide is alumina.

14. The adsorbent system as recited in claim 11, wherein the granules of acid- or metal salt-impregnated adsorbent have the acid, and the acid is phosphoric acid.

15. The adsorbent system as recited in claim 11, wherein the granules of acid- or metal salt-impregnated adsorbent have the metal salt, and the metal salt is zinc chloride.

16. A method for removing organic contaminants and ammonia from a gas flow using an adsorbent system, the method comprising:
passing a gas flow through a passage that has first and second adsorbents arranged in the passage, wherein the first adsorbent includes granules of non-impregnated activated carbon and the second adsorbent bed includes granules of acid- or metal salt-impregnated adsorbent, and the granules of acid- or metal salt-impregnated adsorbent have, by weight, at least 20% acid or metal salt content;
removing organic contaminants from the gas flow using the first adsorbent; and
removing ammonia from the gas flow using the second adsorbent,
wherein the granules of acid- or metal salt-impregnated adsorbent have, by weight, at least 35% acid or metal salt content, the granules of non-impregnated activated carbon and the granules of acid- or metal salt-impregnated adsorbent have a size of mesh 4 to mesh 40, and, by total combined weight of the granules of non-impregnated activated carbon and the granules of acid- or metal salt-impregnated adsorbent, the first adsorbent bed has 55%-75% of the granules of non-impregnated activated carbon and the second adsorbent bed has 45%-25% of the granules of acid- or metal salt-impregnated adsorbent.

17. The method as recited in claim 16, including first removing the organic contaminants, followed by removing the ammonia.

* * * * *